No. 884,294. PATENTED APR. 7, 1908.
G. H. PHILLIPS.
TIRE SEALING DEVICE.
APPLICATION FILED OCT. 30, 1907.

Witnesses.
Raphael G. Blanc.
M. M. Harrington.

Inventor.
George H. Phillips.
By Henry J. Miller
atty.

UNITED STATES PATENT OFFICE.

GEORGE H. PHILLIPS, OF PLYMOUTH, MASSACHUSETTS, ASSIGNOR OF ONE-HALF TO HIMSELF AND ONE-HALF TO GEORGE F. SOULE, OF PLYMOUTH, MASSACHUSETTS.

TIRE-SEALING DEVICE.

No. 884,294.  Specification of Letters Patent.  Patented April 7, 1908.

Application filed October 30, 1907. Serial No. 399,818.

*To all whom it may concern:*

Be it known that I, GEORGE H. PHILLIPS, of Plymouth, in the county of Plymouth and State of Massachusetts, have invented a new and useful Improvement in Tire-Sealing Devices; and I hereby declare that the following is a full, clear, and exact description of the same, reference being had to the accompanying drawings, forming part of this specification.

This invention relates to improvements in devices for covering and sealing blow out holes in pneumatic tire casings and particularly for sealing such holes as may occur in the sides or upper portions of the tire casing.

The object of the invention is to so construct a tire sealing device of this general nature that it may be readily secured and pressed in place to cover blow out or similar holes.

The invention consists in such peculiar features of construction and combination of parts as shall hereinafter be more fully described and pointed out in the claims.

Figure 1:
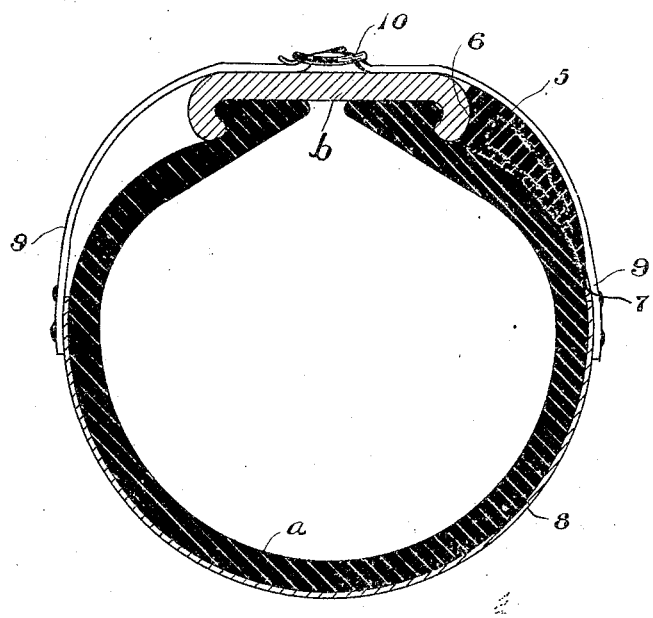
Figure 2:
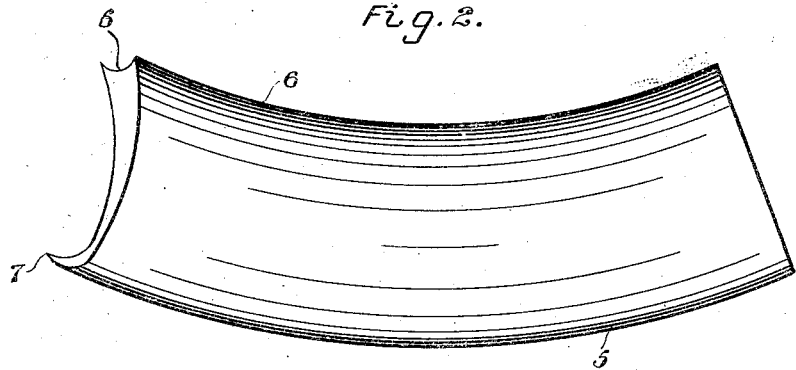

Figure 1, represents a cross sectional view of a part of a wheel rim with the section of a pneumatic tire and the improved tire sealer secured in place. Fig. 2, represents a perspective view of the sealing member.

Similar numerals of reference designate corresponding parts in both figures.

In carrying this invention into practice my object is to so construct a cover or closure adapted to fit against the upper portion and side of a pneumatic tire to which it is designed to conform whereby blow holes or other openings accidentally occuring in such portions of the tire may be closed and sealed against the escape of the tire inflating medium. The practical application of this blow hole sealing device includes the use of means whereby the sealing member may be secured in place.

As shown in the drawings *a* represents the casing or sheath of a pneumatic tire of any usual construction and *b* represents a portion of a wheel rim to which said tire is secured. The tire sealing member 5, shown in perspective in Fig. 2 of the drawings, is preferably formed of a combination of rubber and fabric or of other comparatively flexible and elastic material and is segmental in shape both in plan and end view and is designed to conform to the shape of the upper portion and side of the tire both by reason of its shape and on account of its flexibility. This sealing member 5 has the shoulder 6, which is designed to fit against the wheel rim *b*, and the comparatively thin edge 7 which covers the side portion of the tire.

The preferred means for securing the sealing member in place and pressing it against the tire consists of the shoe 8, preferably of leather, which fits against the tread of the tire and extends upward at the sides of the tire towards the wheel rim *b*, more or less as may be most desirable in practice, and having straps 9—9 having buckles 10 by which said straps when drawn over the sealing member 5 may be secured over the wheel rim *b*.

In the application of this device the sealing member 5 is placed over the blow holes in the side or upper portion of the tire with its shoulder 6 bearing against the wheel rim, the shoe 8 is then placed in position against the tread of the tire and the straps 9 are carried over the sealing member and engaged with their buckles and are then drawn tight to press the sealing member against the side of the tire, upward movement of the sealing member under stress of the tightened straps is prevented by the shoulder 6 thereof bearing against the wheel rim.

Having thus described my invention I claim as new and desire to secure by Letters Patent.

A sealing device for pneumatic tires comprising a sealing member having a shoulder, adapted to fit against the wheel rim, and a comparatively thin edge, and means adapted to embrace the tire and wheel rim for securing such sealing membe 'n place.

GEORGE H. PHILLIPS.

Witnesses:
HENRY W. BARNES,
JOHN L. BACHELDER.